United States Patent [19]

Hoffman

[11] Patent Number: 5,278,729
[45] Date of Patent: Jan. 11, 1994

[54] COMPACT ROTATABLE ELECTRICAL DEVICE

[75] Inventor: Arden L. Hoffman, Monroeville, Ind.

[73] Assignee: Magnavox Electronic Systems Company, Fort Wayne, Ind.

[21] Appl. No.: 38,568

[22] Filed: Mar. 26, 1993

Related U.S. Application Data

[63] Continuation of Ser. No. 866,584, Apr. 10, 1992, abandoned.

[51] Int. Cl.$^5$ .............................. H04B 1/00
[52] U.S. Cl. .......................... 361/809; 74/553; 200/296; 338/162; 338/317; 361/814; 455/347
[58] Field of Search .................... 74/553.X; 200/296.X, 11.R, 11.G, 11.K, 11.J; 248/27.1X; 334/7; 338/184, 190, 199, 152, 162.X, 317.X; 174/52.1; 361/346, 417, 419.X, 422.X; 455/90, 128, 347.X, 348

[56] References Cited

U.S. PATENT DOCUMENTS

| | | | |
|---|---|---|---|
| 3,560,672 | 2/1971 | Ludlum | 200/11 R |
| 3,571,534 | 3/1971 | Ashman | 200/11 R |
| 3,906,371 | 9/1975 | Tsuji | 361/422 |
| 3,952,176 | 4/1976 | Holder | 200/11 R |
| 4,110,722 | 8/1978 | Brendle | 338/174 |
| 4,117,444 | 9/1978 | Hildreth | 338/198 |
| 4,144,555 | 3/1979 | McGalliard | 361/346 |
| 4,295,119 | 10/1981 | Kasashima | 338/162 |
| 4,387,374 | 6/1983 | Wiener | 343/5 EM |
| 4,532,817 | 8/1985 | Chaki | 74/10.33 |
| 4,891,623 | 1/1990 | Obara | 338/163 |
| 4,892,987 | 1/1990 | Aframian | 200/296 |
| 5,083,477 | 1/1992 | Geil | 74/553 |
| 5,185,804 | 2/1993 | Watanabe | 381/86 |

FOREIGN PATENT DOCUMENTS 62-114016 5/1987 Japan.

*Primary Examiner*—Gerald P. Tolin
*Attorney, Agent, or Firm*—John H. Crozier; Richard T. Seeger

[57] ABSTRACT

In a preferred embodiment, there is provided a compact rotatable electrical device for attachment to a mounting panel of an electrical apparatus. The mounting panel has inner and outer surfaces and defines an interior space of the apparatus, with the inner surface adjacent the interior space. The device includes: a control body having a control shaft extending upwardly from the distal end thereof, the proximal end of the control shaft being connected to operative elements within the control body; and apparatus for attachment of the proximal end of the control body to the mounting panel through an opening defined therethrough such that the control body, when so attached, will be disposed substantially outside the interior space.

9 Claims, 2 Drawing Sheets

COMPACT ROTATABLE ELECTRICAL DEVICE

This is a continuation of co-pending application Ser. No. 07/866,584, filed on Apr. 10, 1992, now abandoned.

BACKGROUND OF THE INVENTION

1. Field of the Invention

The present invention relates generally to rotatable electrical devices, such as switches, variable capacitors, and potentiometers, and, more particularly, but not by way of limitation, to a novel compact rotatable electrical device that reduces the volume occupied by conventional such devices in an electrical apparatus.

2. Background Art

Rotatable electrical devices are well known and include rotating switches, variable capacitors, potentiometers, and the like. In one application, such devices may be attached to an external surface of a radio. Typically, the device includes a stationary main control body disposed within the radio and connected to circuitry in the radio. Fixedly attached to and extending from the main control body is a hollow, externally threaded, cylindrical mounting bushing which extends through a hole defined in the external surface. A jamnut threaded on the mounting bushing is tightened against the outside of the external surface and secures the mounting bushing and main control body in place. Extending through the mounting bushing from the operative elements within the control body is a control shaft at the distal end of which external to the mounting surface is attached a knob.

A substantial disadvantage of the above conventional arrangement is that, with the requirement for some electrical apparatus, such as handheld radios, to become smaller and smaller, rotatable devices of the type noted above consume an increasingly greater percentage of the available volume within the apparatus.

A further disadvantage of the conventional construction of such devices is that the knobs thereof are frequently secured in place by means of set screws which can be loosened by vibration.

Another disadvantage of the conventional construction of such devices is that the hollow mounting bushing is a point of weakness and such bushings frequently break.

An additional disadvantage of the conventional construction of such devices is that the control shaft thereof is relatively long which presents a long lever arm and another point of weakness.

In some applications, protective ears have been provided on the mounting surface to protect the devices from breaking. These protective ears can consume valuable control panel space and hinder operation, in addition to representing additional manufacturing cost.

Yet another disadvantage of the conventional construction of such devices is that the jamnut is easily accessible from the outside surface of the panel and, thus, the apparatus is subject to tampering by removal of the jamnut.

Accordingly, it is a principal object of the present invention to provide a rotatable electrical device which is compact and occupies substantially less volume in an electrical apparatus than do conventional rotatable electrical devices.

It is further object of the invention to provide such a device that is strong.

It is an additional object of the invention to provide such a device that is easily and economically constructed.

It is another object of the invention to provide such a device that has a relatively short control shaft.

It is yet a further object of the invention to provide such a device that is relatively tamperproof.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, a compact rotatable electrical device for attachment to a mounting panel of an electrical apparatus, said mounting panel having inner and outer surfaces and defining an interior space of said apparatus, with said inner surface adjacent said interior space, said device comprising: a control body having a control shaft extending upwardly from the distal end thereof, the proximal end of said control shaft being connected to operative elements within said control body; and means for attachment of the proximal end of said control body to said mounting panel through an opening defined therethrough such that said control body, when so attached, will be disposed substantially outside said interior space.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
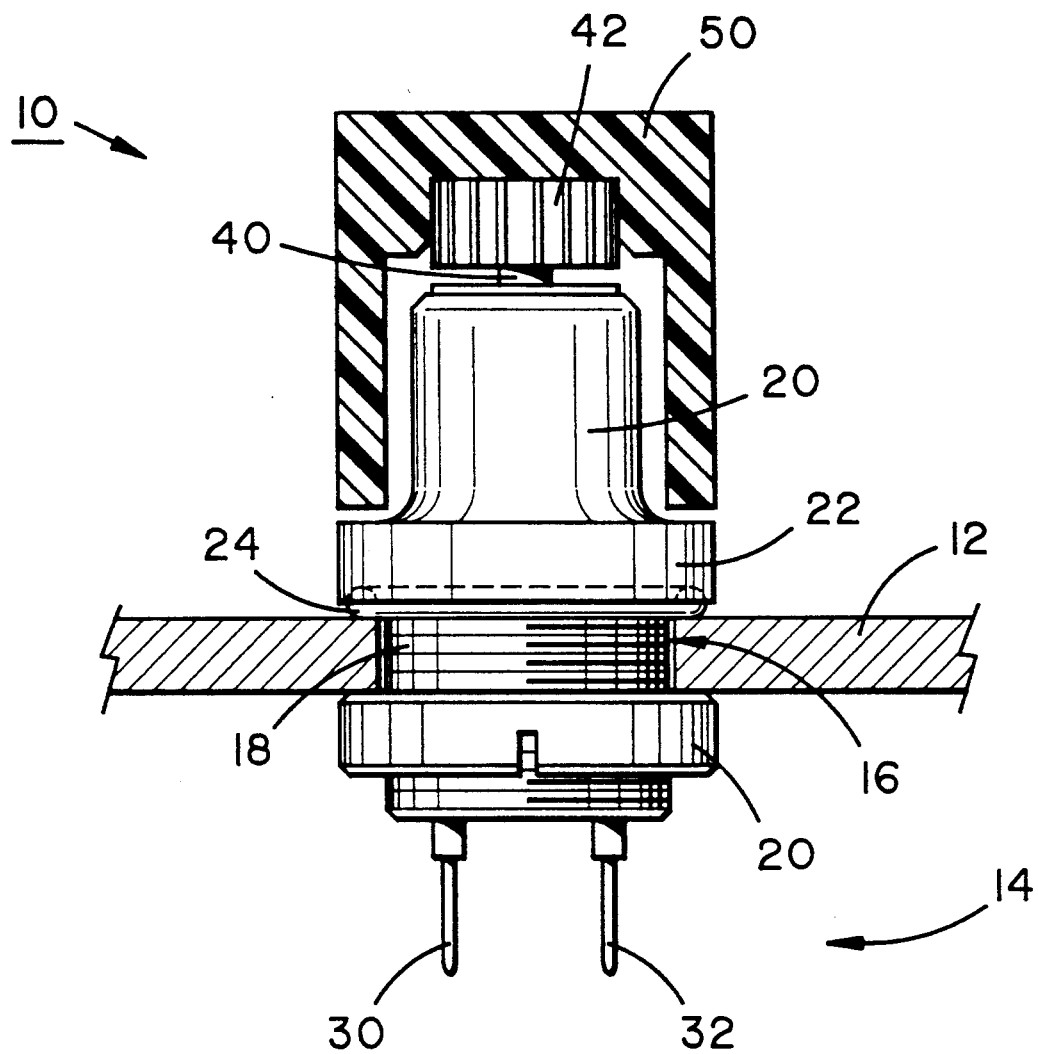
FIG. 1 is a side elevational view, partially in cross-section, of one embodiment of the present invention.

Reference should now be made to the Drawing on which similar or identical elements are given consistent identifying numerals throughout the various figures thereof.

FIG. 1 illustrates a rotatable electrical device, generally indicated by the reference numeral 10, constructed according to the present invention, and which may be, for illustrative purposes only, a rotatable switch, a variable capacitor, or a potentiometer. Device 10 is shown as being mounted in a mounting panel 12 which may be assumed to be part of an otherwise conventional handheld radio, for example, and which defines an interior space 14.

Device 10 includes a control body 20 disposed substantially above the outer surface of mounting panel 12 and extending partially into interior 14 through an opening 16 defined in the mounting panel. The lower portion 18 of control body 10 is threaded so as to accept a jamnut 26 threadingly advanced thereon against the inner surface of mounting panel 12 so as to draw a flange 22 formed on the control body against the outer surface of the mounting panel. An O-ring 24 may be disposed between flange 22 and the outer surface of mounting panel 12 for sealing purposes if desired. Extending from the distal end of lower portion 18 are two prongs 30 and 32 for connection thereto of wiring (not shown).

Extending upwardly from the the distal end of control body 20 is a short control shaft 40 the distal end of which terminates in an enlarged splined portion 42 on which is disposed with an interference press-fit therewith an inverted cup-shaped knob 50. Knob 50 extends downwardly substantially over control body 20 and the outer periphery of the knob is approximately coextensive with the outer periphery of flange 22. It will be understood that the proximal end of control shaft 40 is connected to the conventional operative elements (not shown) of device 10 within control body 20.

A substantial advantage of the construction of device 10 is that the body of the device is almost entirely outside of interior 14, with only enough of the body extending through opening 16 to permit threading thereon of jamnut 26. Consequently, the volume that otherwise would be consumed by a conventional device can be employed for other elements or the apparatus in which device 10 is installed can be reduced in size accordingly.

A further advantage of the construction of device 10 is that the conventional relatively narrow hollow mounting bushing has been replaced with the relatively wide threaded lower portion 18 of control body 20 which could be constructed as a solid member or a nearly solid member, since no shaft needs to extend therethrough.

Another advantage of the construction of device 10 is that knob 50 is not attached to shaft 40 by means of a set screw which could vibrate loose.

An additional advantage of the construction of device 10 is that the length of control shaft 40 external to control body 20 is almost zero, thus virtually eliminating the lengthy lever arm of conventional control shafts.

Yet a further advantage of the construction of device 10 is that jamnut 26 is not subject to tampering, since it is not accessible from the outside of mounting panel 12.

Figure 2:
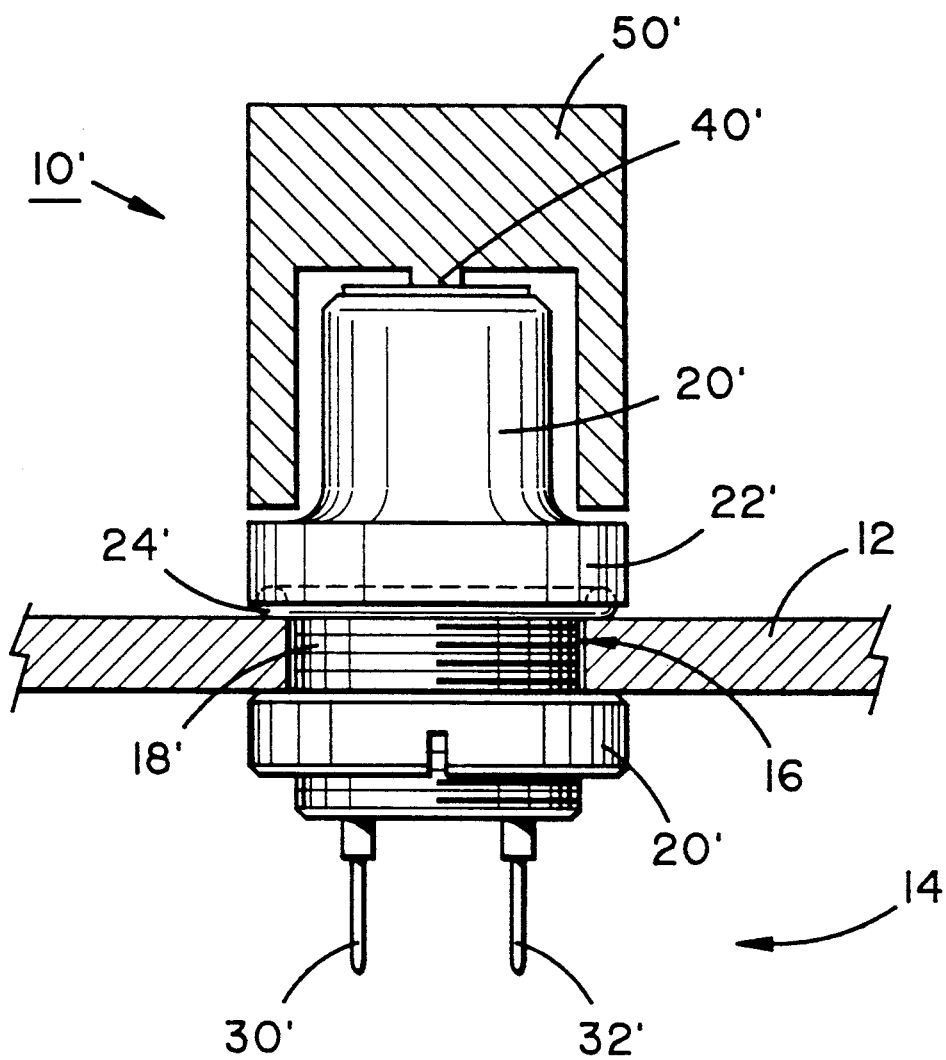
FIG. 2 is a side elevational view, partially in cross-section, of another embodiment of the present invention.

FIG. 2 illustrates another electrical device, generally indicated by the reference numeral 10', constructed according to another aspect of the present invention. Device 10' is identical to device 10 described above, except that device 10' has a control shaft 40' which forms a monolithic structure with a knob 50'. This arrangement has the further advantage of ensuring that knob 50' cannot be pulled from control shaft 40'.

Devices 10 and 10' may be constructed of any suitable materials by conventional means. Knob 50 may be a polymeric material, as is indicated on FIG. 1, or it may be a suitable metallic material.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. An electrical control assembly, comprising:
   (a) a mounting panel of an electrical apparatus, said mounting panel having inner and outer surfaces and defining an interior space of said apparatus, with said inner surface adjacent said interior space,
   (b) a control body having a control shaft extending upwardly from the distal end thereof, the proximal end of said control shaft being connected to operative electrical elements within said control body; and
   (c) a knob attached to the distal end of said control shaft and extending downwardly over and around said body;
   (d) an outwardly extending flange means formed around the outer periphery of the proximal end of said control body; and
   (e) said control body having attachment means extending downwardly from said flange for attachment of said control body to said mounting panel through an opening defined therethrough, with said flange adjacent said outer surface, such that said control body is disposed substantially outside said interior space.

2. An assembly, as defined in claim 1, wherein:
   (a) the distal end of said shaft terminates in a splined surface; and
   (b) said knob is attached to said splined surface in an interference press-fit.

3. An assembly, as defined in claim 1, wherein: said control shaft and said knob are monolithic.

4. An electrical control assembly, comprising:
   (a) a mounting panel of an electrical apparatus, said mounting panel having inner and outer surfaces and defining an interior space of said apparatus, with said inner surface adjacent said interior space,
   (b) a control body having a control shaft extending upwardly from the distal end thereof, the proximal end of said control shaft being connected to operative electrical elements within said control body; and
   (b) means attaching the proximal end of said control body to said mounting panel through an opening defined therethrough such that said control body is disposed substantially outside said interior space.

5. An assembly, as defined in claim 4, further comprising:
   (a) an outwardly extending flange formed around the outer periphery of said control body; and
   (b) said means for attachment comprises said control body having a lower threaded portion inserted through said opening and partially into said interior space with a nut threaded thereon against said inner surface so as to draw said flange against said outer surface and thereby secure said control body to said mounting panel.

6. An assembly, as defined in claim 4, further comprising:
   (a) the distal end of said shaft terminating in a splined surface; and
   (b) a knob attached to said splined surface in an interference press-fit.

7. An assembly, as defined in claim 6, wherein said knob has an inverted cup shape and extends downwardly over and around said control body.

8. An assembly, as defined in claim 4, further comprising: said control shaft having a knob thereon, said control shaft and said knob being monolithic.

9. An assembly, as defined in claim 8, wherein said knob has an inverted cup shape and extends downwardly over and around said control body.

* * * * *